(12) United States Patent
Kawakami

(10) Patent No.: US 6,778,836 B2
(45) Date of Patent: *Aug. 17, 2004

(54) MOBILE OBJECT SEARCH SYSTEM AND MOBILE OBJECT SEARCH METHOD FOR MOBILE SERVICE

(75) Inventor: Takaaki Kawakami, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,775

(22) Filed: Oct. 16, 1998

(65) Prior Publication Data

US 2002/0065084 A1 May 30, 2002

(30) Foreign Application Priority Data

Mar. 17, 1998 (JP) .......................................... 10-067321

(51) Int. Cl.⁷ ................................................. H04Q 7/20
(52) U.S. Cl. ............................... 455/456.1; 455/456.2; 455/404.2
(58) Field of Search ................................ 455/456, 403, 455/410, 575, 411, 432, 435, 445, 461, 575.1, 422.1, 404.2, 421, 441, 443, 444, 458, 100, 101, 103, 456.1, 456.2, 432.1, 435.1, 456.3; 342/457, 465, 456, 463, 450, 454; 370/338, 256, 390, 395, 400, 407, 408, 95.2; 379/59, 60

(56) References Cited

U.S. PATENT DOCUMENTS

| | | | | |
|---|---|---|---|---|
| 4,700,374 A | * | 10/1987 | Bini .............................. | 379/60 |
| 4,843,622 A | * | 6/1989 | Yotsutani et al. ............. | 379/59 |
| 5,345,595 A | * | 9/1994 | Johnson et al. ............ | 455/33.1 |
| 5,432,841 A | * | 7/1995 | Rimer .......................... | 379/59 |
| 5,448,760 A | * | 9/1995 | Frederick .................... | 455/56.1 |
| 5,515,419 A | * | 5/1996 | Sheffer ......................... | 379/58 |
| 5,535,431 A | * | 7/1996 | Grube et al. ................ | 455/54.1 |
| 5,659,596 A | * | 8/1997 | Dunn .......................... | 455/456 |
| 5,697,064 A | * | 12/1997 | Okamoto et al. ........... | 455/53.1 |
| 5,734,977 A | * | 3/1998 | Sanmugam ................ | 455/410 |
| 5,832,381 A | * | 11/1998 | Kauppi ........................ | 455/432 |
| 5,898,783 A | * | 4/1999 | Rohrbach .................... | 380/49 |
| 5,924,040 A | * | 7/1999 | Trompower ................. | 455/456 |
| 5,973,643 A | * | 10/1999 | Hawkes et al. ............. | 342/457 |
| 5,983,109 A | * | 11/1999 | Montoya ..................... | 455/456 |
| 6,078,575 A | * | 6/2000 | Dommety et al. .......... | 370/338 |
| 6,138,016 A | * | 10/2000 | Kulkarni et al. ............ | 455/433 |
| 6,167,274 A | * | 12/2000 | Smith .......................... | 455/456 |

FOREIGN PATENT DOCUMENTS

JP            1-154634 A  *  6/1989   ............ H04B/7/26

* cited by examiner

Primary Examiner—Edward F. Urban
Assistant Examiner—C. Chow
(74) Attorney, Agent, or Firm—Katten Muchin Zavis Rosenman

(57) ABSTRACT

The location of a mobile object can be specified which lies within a radio zone range to which the range of only one base station corresponds, and a mobile object search method therefor. The mobile object search system includes a database for which is provided a mobile object tracing indication to enable the continuous monitoring of the location of a mobile object which has issued a call when a request for location information concerning the mobile object is transmitted to a switchboard in a mobile service system; mobile object tracing means for registering a mobile object display in the data base; and mobile object location monitoring means for repeatedly monitoring the location of the mobile object, and for using a notification of a change in the location of the mobile object by a minimum control area unit which the mobile object communication network recognizes. The minimum control area unit is a radio zone for one base station.

8 Claims, 20 Drawing Sheets

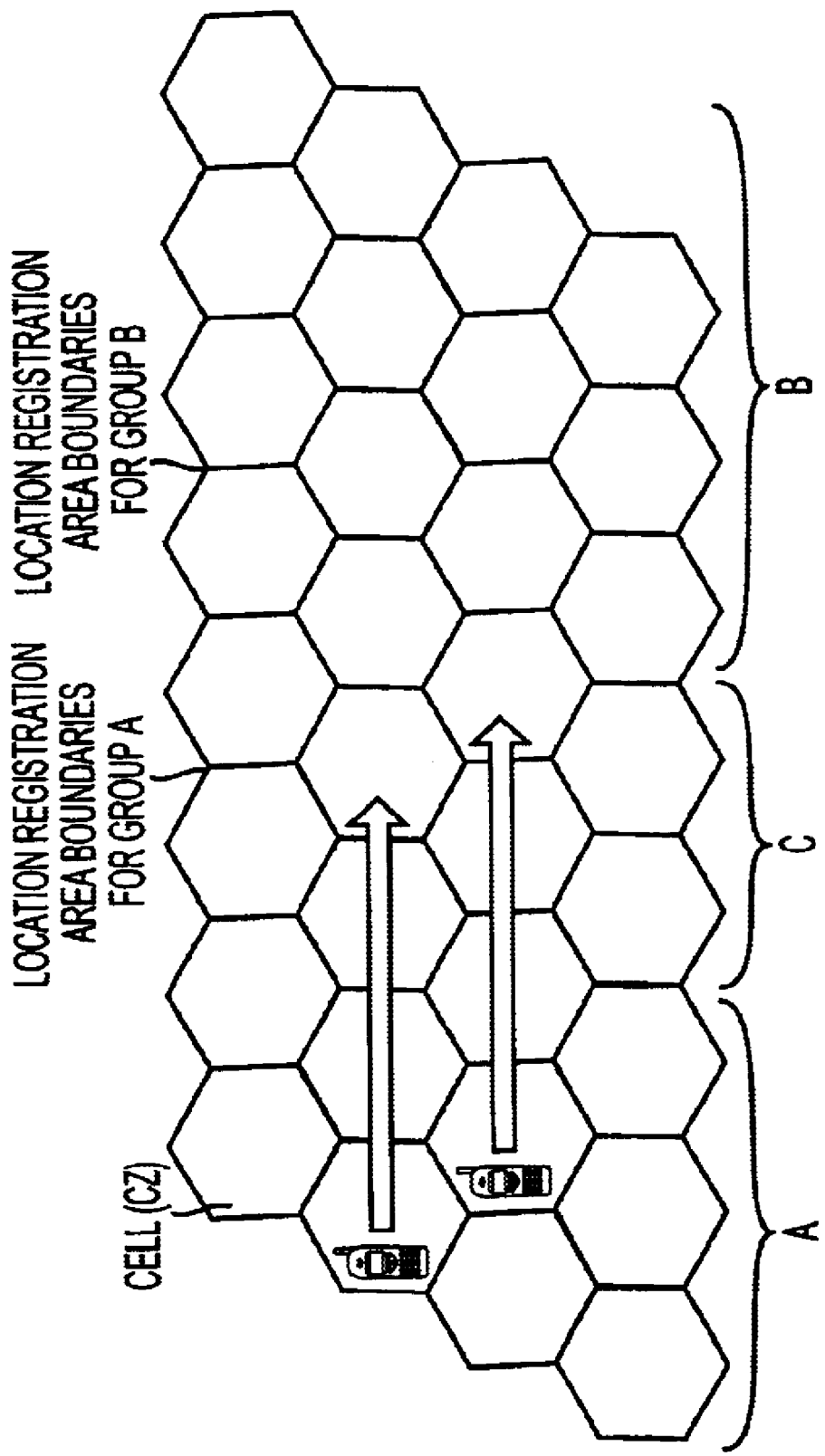

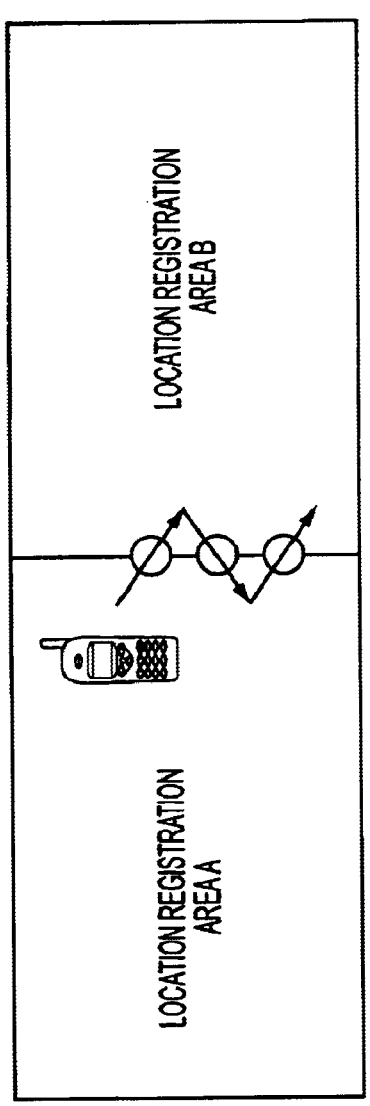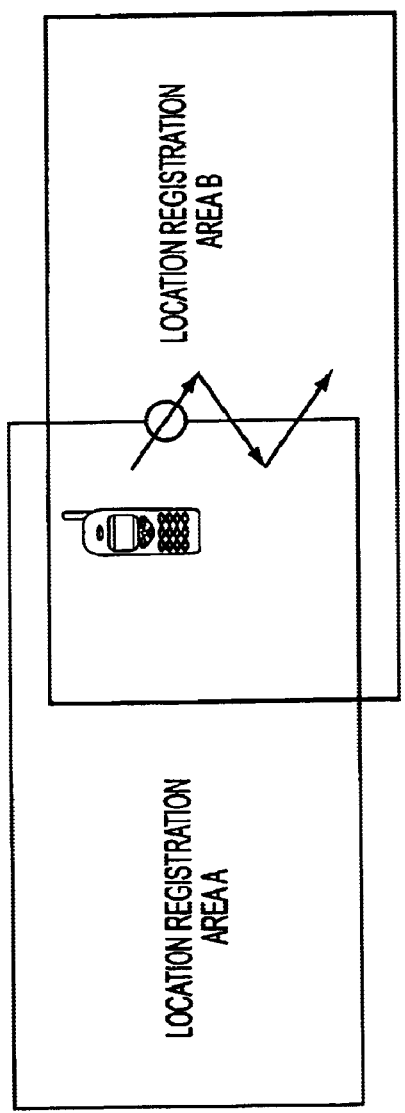

MOBILE OBJECT SEARCH SYSTEM AND MOBILE OBJECT SEARCH METHOD FOR MOBILE SERVICE

BACKGROUND OF THE INVENTION

1. Field of the Invention

The present invention relates to a mobile object search system which performs a continuous search of a mobile service network to ascertain the location of mobile objects, and to a mobile object search method.

2. Related Arts

When a search of a mobile service network is performed for a mobile object which has issued a malicious call, because such an object is not established at a permanent location and can be moved from place to place, it is important that the latest known location of the mobile object be immediately available.

According to the prior art, information concerning the location of a mobile object is output each time the object's location is registered at a mobile object switchboard, i.e., a mobile service switching center (MSC) provided for a mobile service network.

Therefore, since the frequent registration of locations imposes a heavy load on a mobile service network, the geographical range of a location registration area is quite large. And in Japan, an example location registration area is equivalent in size to that of a prefecture.

Thus, as it is not possible to designate a smaller search area, a large location registration area must be specified when attempting to locate a mobile object which issued a call. This constitutes an especially grave impediment when there is a socially important reason for a search, such as when a mobile object must be located from which a call was issued which is associated with a crime.

SUMMARY OF THE INVENTION

Since the prior art employs the location registration area when referring to a mobile object from which a malicious call has been issued, when searching for the location of a mobile object it is difficult to designate a deployment range smaller than the location registration area. It is, therefore, one objective of the present invention to provide a mobile object search system by which the location of a mobile object can be specified which lies within a radio zone range to which the range of only one base station corresponds, and a mobile object search method therefor.

To achieve the above objective, according to one aspect of the present invention, a mobile object search system includes:

a database for which is provided a mobile object tracing indication to enable the continuous monitoring of the location of a mobile object which has issued a call when a request for location information concerning the mobile object is transmitted to a switchboard in a mobile service system;

mobile object tracing means for registering a mobile object display in the data base; and mobile object location monitoring means for repeatedly monitoring the location of the mobile object, and for using a notification of a change in the location of the mobile object by a minimum control area unit which the mobile object communication network recognizes.

The minimum control area unit is a radio zone for one base station.

According to another aspect of the present invention, the mobile object tracing means and the mobile object location monitoring means are included in a location register, and the mobile object tracing means includes mobile object tracing start means for initiating a mobile object tracing process, and a mobile object tracing halting means for halting the tracing of the mobile object.

According to an additional aspect, location registration means for storing the location information is included in the location register. The mobile object location monitoring means includes a function for issuing notifications that location registrations have been performed, and continuously issues notifications of location changes in accordance with the location registrations by the minimum control area unit of the location registration area.

According to either aspect, when the mobile object moves to a location registration area of another network, the mobile object tracing display is transmitted so as to operate the mobile object location monitoring means of the network wherein the mobile object is located.

In addition, to achieve the above objective, according to a further aspect of the present invention a mobile object search method comprises the steps of:

transmitting, to a mobile service switching center in a mobile service system, a request for location information concerning a mobile object from which a call has been issued;

setting, in a database for the mobile service switching center, a mobile object tracing display in order to perform the continuous monitoring of the location of the mobile object; and transmitting notifications of a change in the location of the mobile object by a minimum control area unit which the mobile service network recognizes.

According to still another aspect, the minimum control area unit constitutes a radio zone for one base station.

According to a still additional aspect, the mobile object search method further comprises the steps of:

updating the database, based on the request for a search for the location information concerning the mobile object from which a call has been issued, by setting a mobile service switching center number in a location registration area wherein the mobile object is located and by establishing a fact that a radio zone is unknown;

forwarding a request for a mobile object location examination to a mobile service switching center which corresponds to the mobile service switching center number;

specifying, by paging, a radio zone in which the mobile object is located when a response is received to the request for the mobile object location examination;

outputting the specified radio zone as location information; and updating the database by setting the specified radio zone in the database.

According to a still further objective, the mobile object search method further comprises the steps of:

starting a timer after the location information is updated; and issuing another request for a search for location information concerning the mobile object when the timer count equals a predetermined value.

In addition, the mobile object is controlled by the mobile service switching center so that power is at least supplied to a wireless circuit in the mobile object. Specifically, in response to a power-OFF operation for the mobile object, only the supply of power to the interface of the mobile object would be halted. Thus, there is no chance that the search for the mobile object will be disabled when the mobile object is powered off.

Furthermore, a radio zone in which the mobile object, which is a target of the tracing display is present is periodically monitored, and changes in the location of the mobile object are sequentially reported to the mobile service switching center.

Further, a change in the movement of the mobile object in the radio zone is periodically monitored, and when the radio zone is changed, that effect is reported to the mobile service switching center.

Moreover, a radio zone in which the mobile object is currently present is compared with a radio zone in which the mobile object was previously present, and when a plurality of matches are detected, a change in the radio zone is reported to the mobile service switching center. As a result, it is possible to avoid frequent notifications of changes in the radio zone of the mobile object.

Other objectives and features of the present invention will become apparent during the course of the description of the embodiments which is given while referring to the accompanying drawings.

BRIEF DESCRIPTION OF THE DRAWINGS

FIG. 18 is a diagram, showing a method for reducing a load which is imposed on a network due to location registration, for explaining the division used to designate location registration areas in accordance with a mobile object group;

FIGS. 19A and 19B are diagrams, showing another method for reducing a load which is imposed on a network due to location registration, for explaining the overlapping of two location registration areas.

DETAILED DESCRIPTION OF THE PREFERRED EMBODIMENTS

Figure 1:
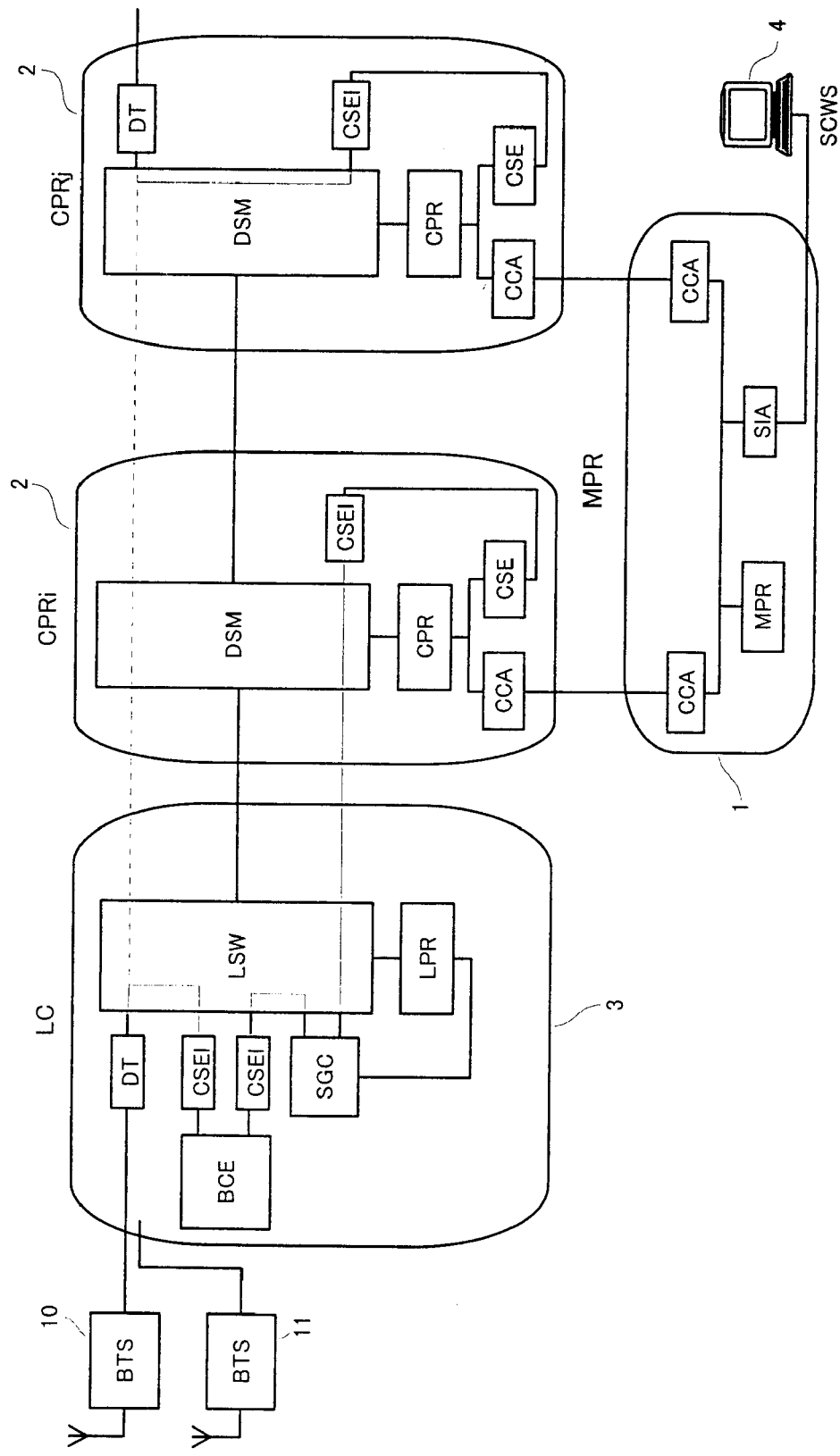
FIG. 1 is a block diagram illustrating the basic structure of a mobile service switching center according to the present invention.

The preferred embodiments of the present invention will now be described while referring to the accompanying drawings. It should be noted that the same reference numerals are used throughout to denote corresponding or identical components.

To make it easier to understand the present invention, an explanation will be given covering the general network configuration of a mobile object communication system and the general location registration process.

Figure 17:
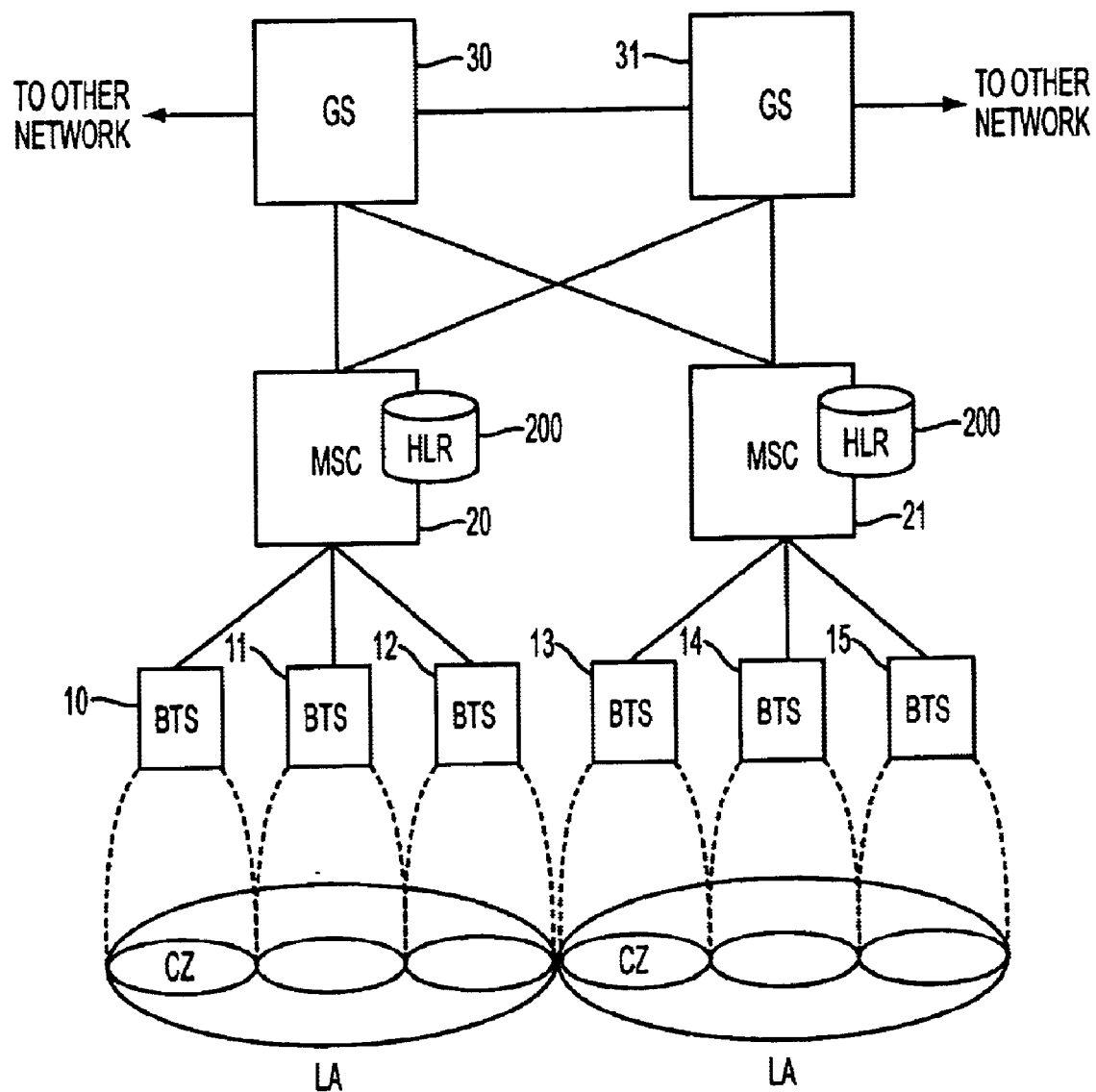
FIG. 17 is a diagram illustrating a network configuration for a mobile object communication system.

FIG. 17 is a diagram illustrating the network configuration of a mobile object communication system. Each of the cell zones CZ corresponds to one of a plurality of base stations BTSs 10 to 15. Each of the mobile service switching centers MSCs 20 and 21, which are mobile object switchboards, constitutes a location registration area LA servicing, for example, three cell zones CZs.

Location registration numbers for corresponding location registration areas LAs are transmitted by the base stations 10 to 12 or 13 to 15, each of which corresponds to one of the cell zones CZ in the two sets of three, to the mobile objects in their respective zones. Each of the mobile objects compares the location registration number it receives with the number of the area LA in which it is registered. When the two location registration numbers do not match, the mobile object recognizes that it has been relocated and is in a different location registration area LA.

Then, a location registration request is transmitted by the mobile object, and its location is registered at which ever mobile service switching center 20 or 21 corresponds to the new location registration area LA in which the mobile object is now located.

In FIG. 17 a mobile service network for one provider is constituted by one of the mobile service switching centers 20 and 21, and is connected to the network of another provider.

When a mobile object is moved from a location registration area LA in which it is registered, a reduction in the load imposed on a network due to the need for location registration is especially important. One method for reducing this load is shown in FIG. 18.

According to the method shown in FIG. 18, a plurality of mobile objects are so grouped that they divide location registration areas. That is, the grouping of the mobile objects and the division of the location registration areas are means by which shifts to new location registration areas LA are made which correspond to group numbers in accordance with the mobile object number.

In FIG. 18 a plurality of mobile objects are divided into a group A and a group B. The locations of the mobile objects in group A are registered when they cross the boundary of a location registration area A. The locations of the mobile objects in group B, however, are not registered when they cross the boundary of the location registration A, but are registered when they cross the boundary of a location registration area B.

As a result, the concentration of location registration traffic in a specific set of cell zones (area C in FIG. 18) at an area boundary can be avoided.

In FIGS. 19A and 19B are shown another method for reducing the load which is imposed on a network due to the location registration activity. In FIG. 19A is shown an example where location registration areas A and B are positioned adjacent to each other. Each time a mobile object approaching the boundary between the location registration areas A and B and crosses the boundary, the need for the location registration occurs. In this case, a large load is imposed on the network.

To avoid this load, as is shown in FIG. 19B, the location registration areas A and B are overlapped. In this case, a location registration need only be performed when the mobile object is first moved from the location registration area A to the location registration area B. Even when the mobile object repeatedly moves in and out of the overlapping area, the load imposed on the network can be reduced.

Figure 20:
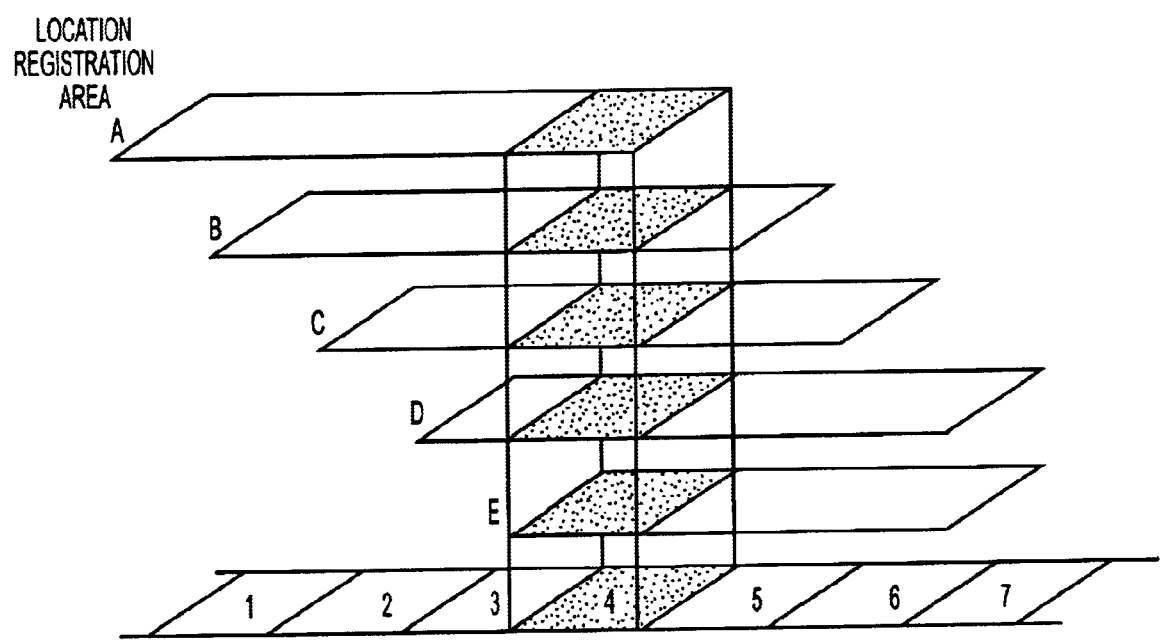
FIG. 20 is a diagram, showing an additional method for reducing a load which is imposed on a network due to location registration, for explaining the overlapping of multiple location registration areas.

In FIG. 20 is shown an example where at one cell zone a plurality of location registration areas A to E overlap each other. When a location registration is performed in a location registration area C in the center of which the overlapped cell zone is located, the performance of frequent location registrations can be prevented.

As is described above, a location registration area is a set of cells, and the technique according to which mobile objects are grouped together and location registration areas are overlapped is employed to reduce the load which is imposed on a network due to the location registration activity. Therefore, it is understood that there is dissociation between the location registration area and the actual position at which the mobile object is located.

The search for a mobile object using the conventional technique is a search for a mobile object registration area LA. Thus, as is shown in FIGS. 18 to 20, when there is dissociation between a location registration area and the actual position at which a mobile object is located, searching for the mobile object is more difficult.

According to the present invention, therefore, provided is a technique that can accurately and rapidly search for and locates a mobile object, even when the location registration arrangement is as described above.

FIG. 1 is a block diagram illustrating the general structure of a mobile service switching center 20 or 21, which according to the present invention is a mobile object switchboard.

Each call processor 2 includes a digital switch DSM which is controlled by a main controller 1 and is connected by a line concentrator 3 to a plurality of base stations 10 and 11.

A person in charge of maintenance inputs a control signal, in particular, a request that a search which is related to the present invention be made to locate a mobile object at a system control workstation 4.

Figure 2:
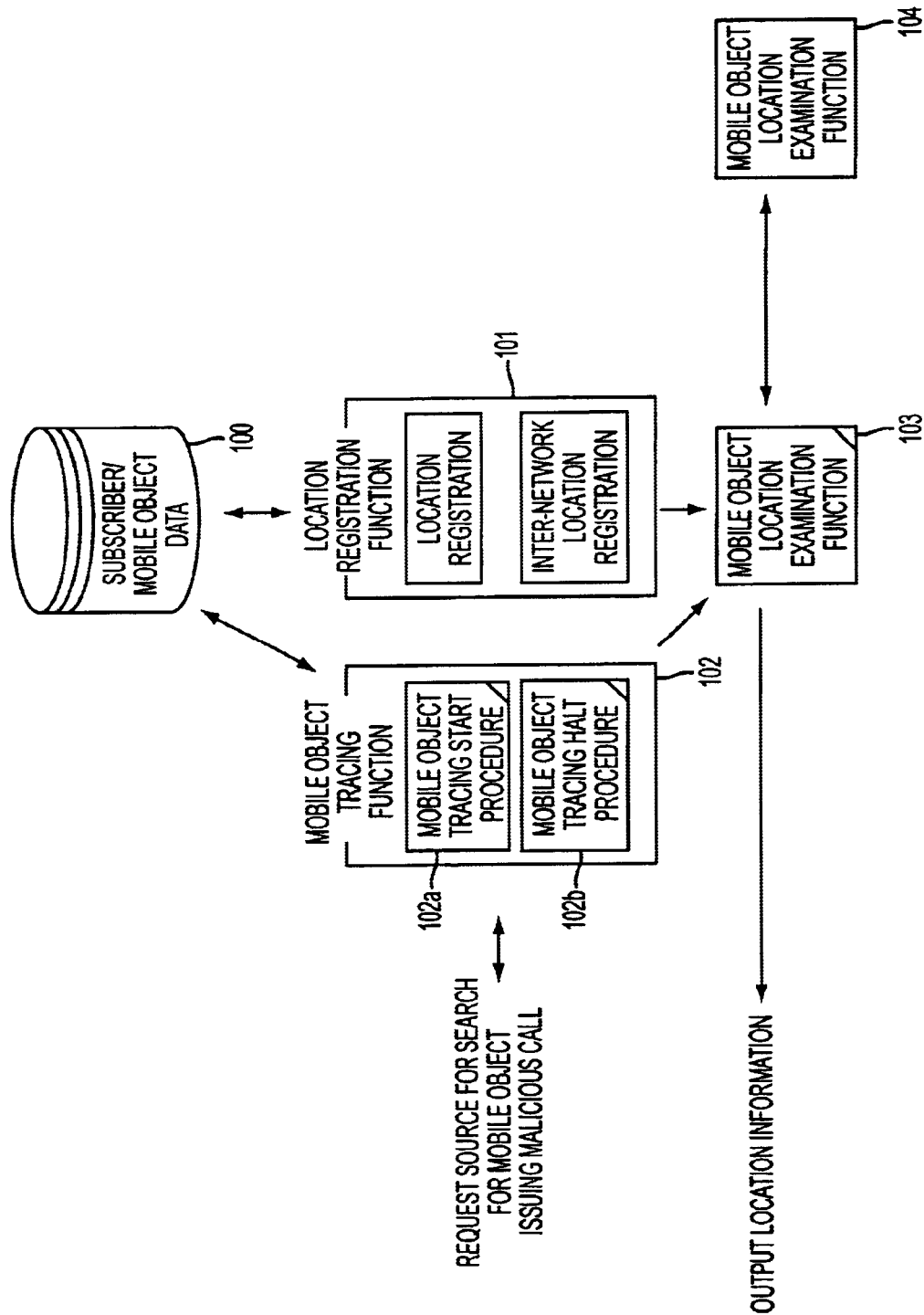
FIG. 2 is a conceptual diagram illustrating the functions employed for searching for a calling mobile object according to the present invention.

FIG. 2 is a conceptual diagram showing the functions according to the present invention of the thus structured mobile service switching centers 20 and 21 when searching for a calling mobile object. In FIG. 2, subscriber data and mobile object data 100 are stored in a memory (not shown) for a main processor MPR in the main controller 1.

Storage of the subscriber data and the mobile object data 100 is controlled by a location registration function 101, which includes the performance of a location registration for TTC standard JJ 70.10 and an inter-network location registration. Data indexed by a subscriber number (MSN) are called subscriber data, and data indexed by a mobile object number (MSI) are called mobile object data.

As previously described, for the registration of the location, a location registration area number is transmitted from the base station to the mobile object, which then compares it with a location registration area number which was stored by the mobile object following a previously performed location registration.

When the two location registration numbers do not match, a location registration is performed via the pertinent base station for a corresponding mobile service switching center 20 or 21 (see FIG. 17).

The above described inter-network location registration is registration which enables communication between subscribers to mobile service networks provided by different managers.

In FIG. 2, subscriber data and mobile object data 100 can be exchanged across the No. 7 common signal line system by the mobile service switching centers 20 and 21, and can be shared by them. The location registration function 101 is provided as a software program in the home location register HLR of the main processor MPR of the main controller 1. The individual functions which will be described later to accomplish the present invention are implemented by a software program or firmware.

In FIG. 2, according to the present invention, the home location register HLR further comprises a mobile object tracing function 102 and a mobile object location monitoring function 103. The mobile object tracing function 102 further includes a mobile object tracing start procedure 102a and a mobile object tracing halt procedure 102b.

The mobile object tracing function 102 and the mobile object location monitoring function 103, together with the mobile object registration function 101, are accomplished when the main processor MPR executes the program stored in the home location register HLR.

Based on the results obtained by the mobile object registration function 101 and the mobile object tracing function 102, the mobile object location monitoring function 103 is performed. As the result obtained by the mobile object location monitoring function 103, a request for the execution of a location examination function 104 is forwarded to another mobile service switching center, and the information concerning the location of the mobile object, which is the result obtained by the examination, is output.

Figure 3:
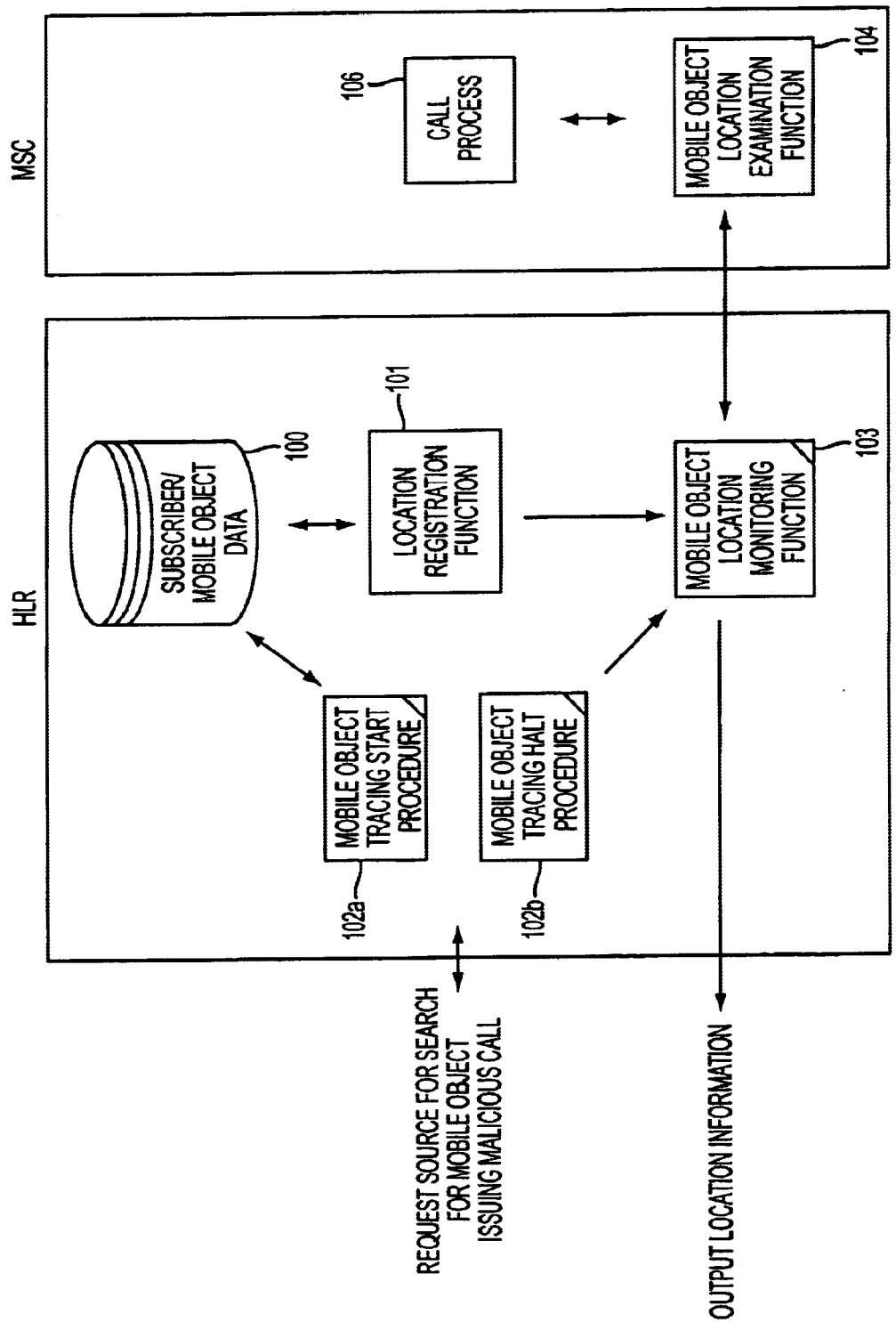
FIG. 3 is a diagram showing a functional arrangement, according to one embodiment of the present invention, for a search for a mobile object which is present in its parent network.

FIG. 3 is a diagram showing a functional structure for a search according to another embodiment, when the mobile object is located in a parent network, and is essentially the same as that in FIG. 2. In FIG. 3, in a home location register HLR are stored subscriber data and mobile object data 100, a location registration function 101, a mobile object tracing start function 102a, a mobile object tracing halt function 102b, and mobile object location monitoring function 103.

A mobile object location examination function 104 interacts with a call processor 106 and serves as the function for mobile service switching centers (MSC) 20 and 21 (see FIG. 17).

Figure 4:
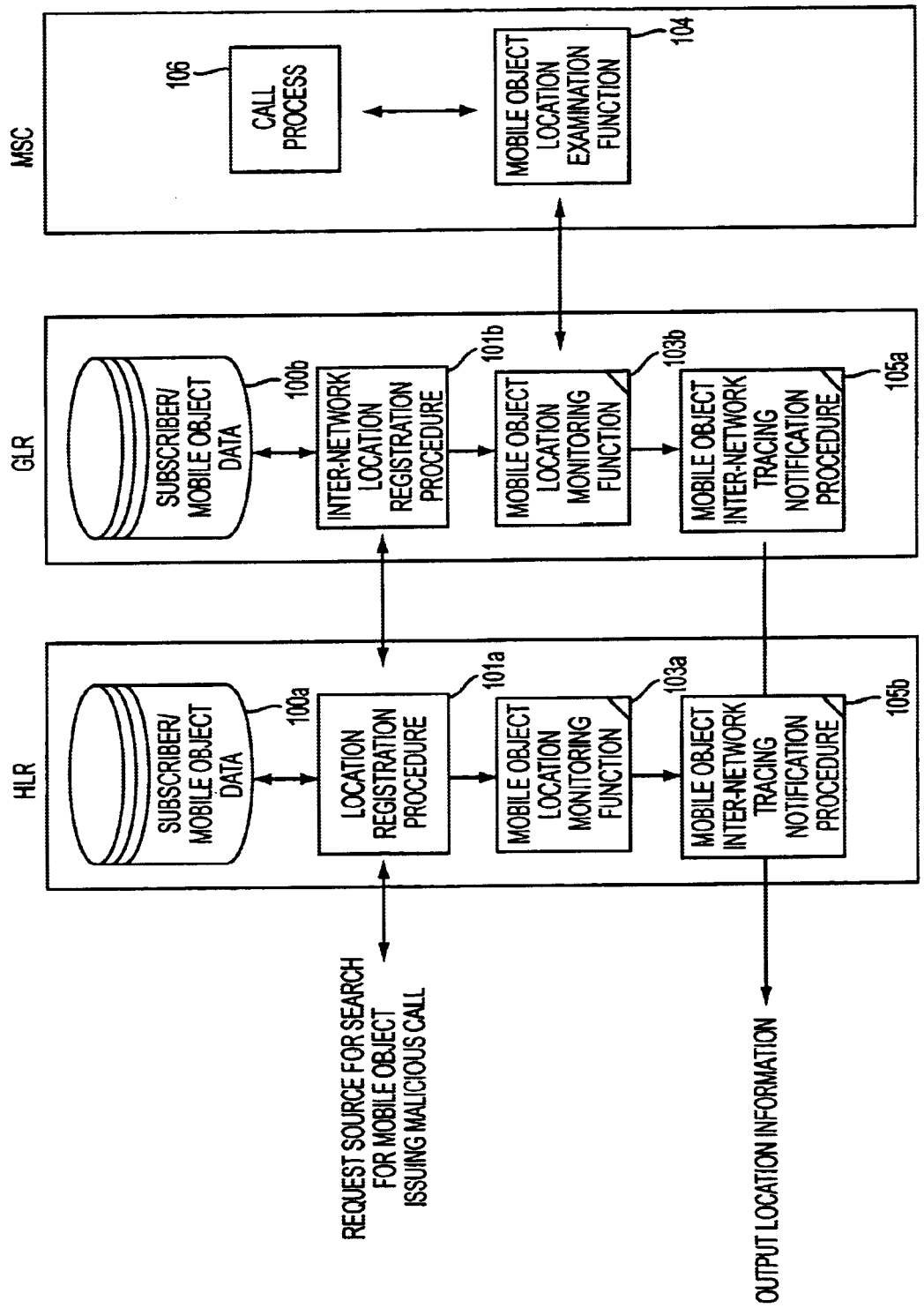
FIG. 4 is a diagram showing a functional arrangement, according to the embodiment of the present invention, for searching for a mobile object which is present in another network.

FIG. 4 is a diagram illustrating the functional structure for a search when a mobile object is located in another network. The main processor MPR of the mobile service switching center MSC includes a home location register HLR and a gateway location register GLR.

The gateway location register GLR is a function for registering subscriber data and mobile object data 100*b* when a mobile object of a subscriber to another network is located in its parent network. Thus, in stored the gateway location register GLR is an inter-network location registration procedure 101*b* for registering a subscriber to another network by entering the subscriber data and the mobile object data 100*b*.

According to the present invention, a mobile object location monitoring function 103*b* is also included in the gateway location register GLR. The mobile object location monitoring function 103*b* interacts with the mobile object examination function 104 of another mobile service switching center MSC to perform a search for a mobile object.

In FIG. 4, independently of the gateway location register GLR, a home location register HLR, as in FIG. 3, is provided in order to perform a search for a mobile object for its registration in the parent network. The home location register HLR includes subscriber data and mobile object data 100*a*, a location registration function 101*a*, and a mobile object location monitoring function 103*a*.

In addition, in FIG. 4 the location registration function 100*a* of the home location register HLR interacts with the inter-network location registration function 101*b* of the gateway location register GLR.

Also, an inter-network mobile object tracing notification function 105*a* is held in the gateway location register GLR, and a mobile object tracing notification function 105*b* is held in the home location register HLR. These notification functions 105*a* and 105*b* interact with each other to output location information for a mobile object in another network.

The processing according to the present invention will now be described while referring to the functional structures shown in FIGS. 3 and 4, and the flowcharts shown in FIGS. 5 to 8.

Figure 5:
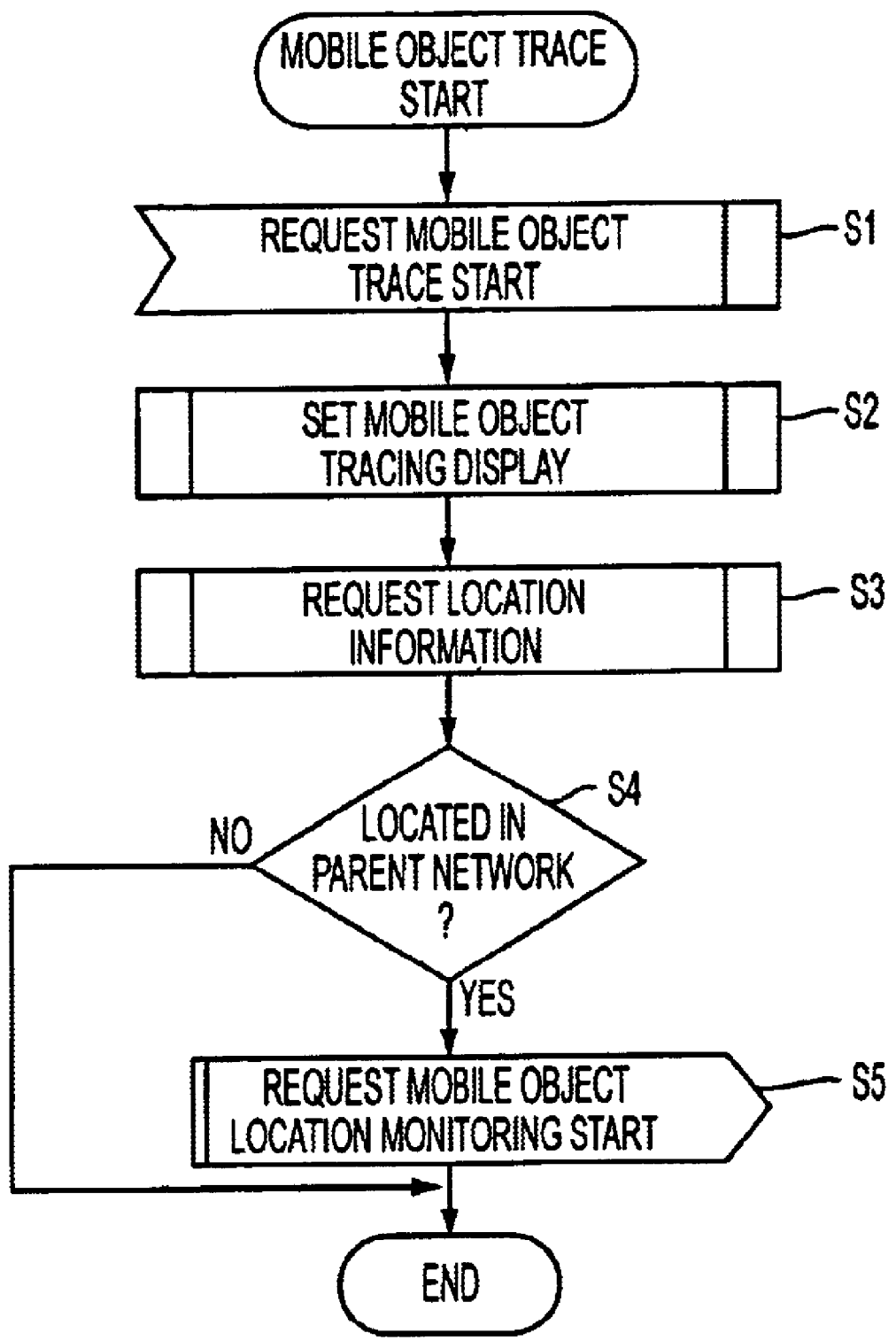
FIG. 5 is a flowchart showing the processing for initiating a trace of a mobile object.

FIG. 5 is a flowchart for the mobile object tracing start procedure 102*a*. When a maintenance man inputs a mobile object tracing start request at the system control workstation (step S1), a display showing that a mobile object is being traced is provided at a location at which pertinent mobile object data in the subscriber data and mobile object data 100 is registered (step S2).

Then, the subscriber data and mobile object data 100 are examined and a request is output for location information concerning a pertinent mobile object (step S3) The request for the location information concerning the mobile object is to determine whether the location registration has been changed, and to request the latest location information.

Following this, a check is performed to determine whether the mobile object which is being searched for is located in the parent network (step S4). If it is not, the mobile object tracing start procedure 102 is terminated. If the mobile object is located in the parent network, a mobile object monitoring start procedure request is transmitted to the mobile object switching center MSC in which the updated location information for the mobile object is registered.

Figure 6:
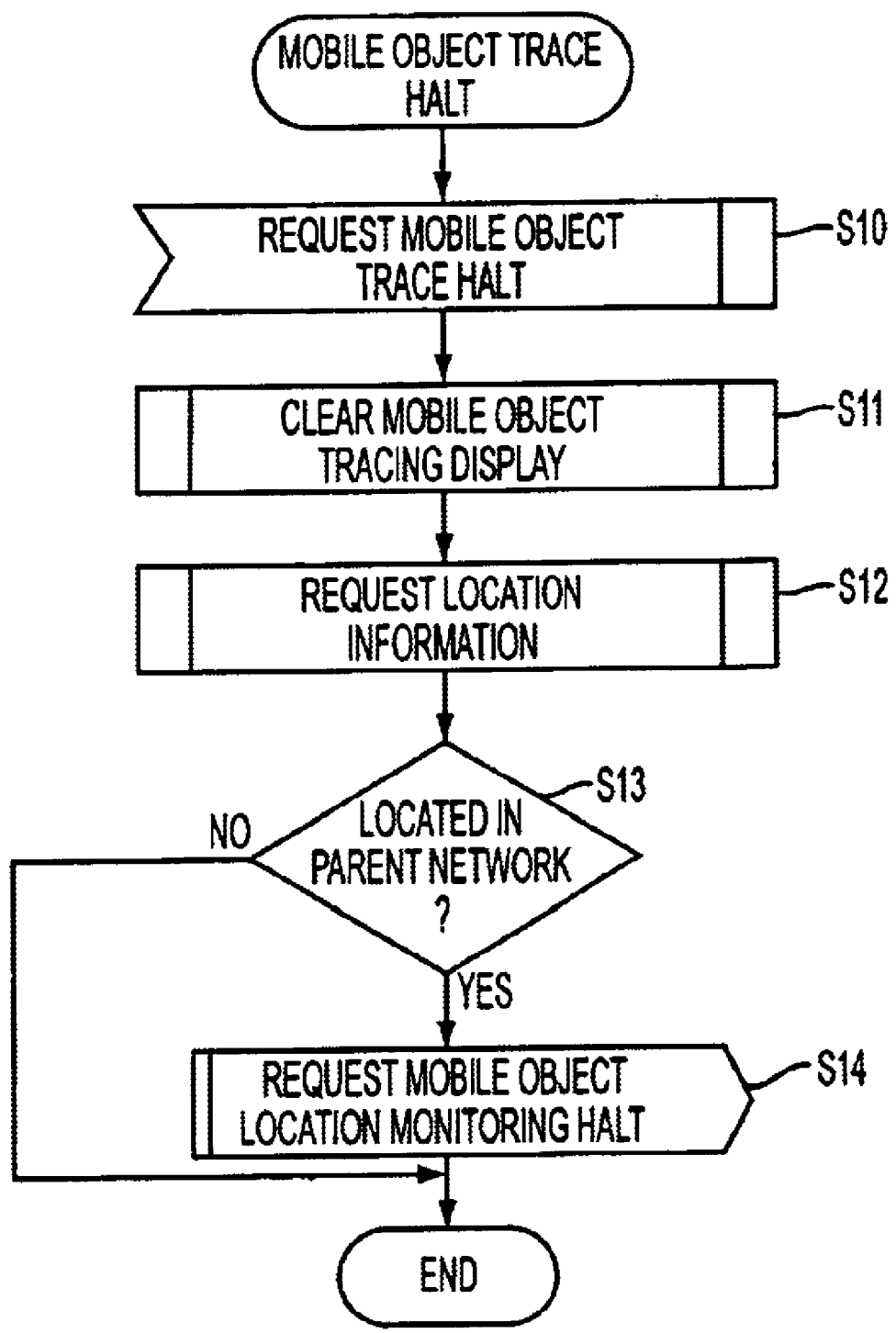
FIG. 6 is a flowchart showing the processing for halting the tracing of the mobile object.

FIG. 6 is a flowchart for the mobile object tracing halt procedure 102*b*. When a maintenance man inputs a mobile object tracing halting request at the system control workstation 4 (step S10), a display showing that the mobile object is being traced is erased from the location at which the pertinent mobile object data of the subscriber data and mobile object data 100 are registered (step S11). As in the mobile object tracing start procedure 102*a*, the subscriber data and mobile object data 100 are examined and the location information for the pertinent mobile object is requested (step S12). Then, a check is performed to determine whether the mobile object is located in the parent network (step S13).

If the mobile object is not located in the network, the mobile object tracing halt procedure 102*b* is terminated. If the mobile object is located in the network, a request for the halting of the monitoring of the mobile object is transmitted to the mobile service switching service MSC at which is registered the updated location information for the mobile object (step S14).

Figure 7:
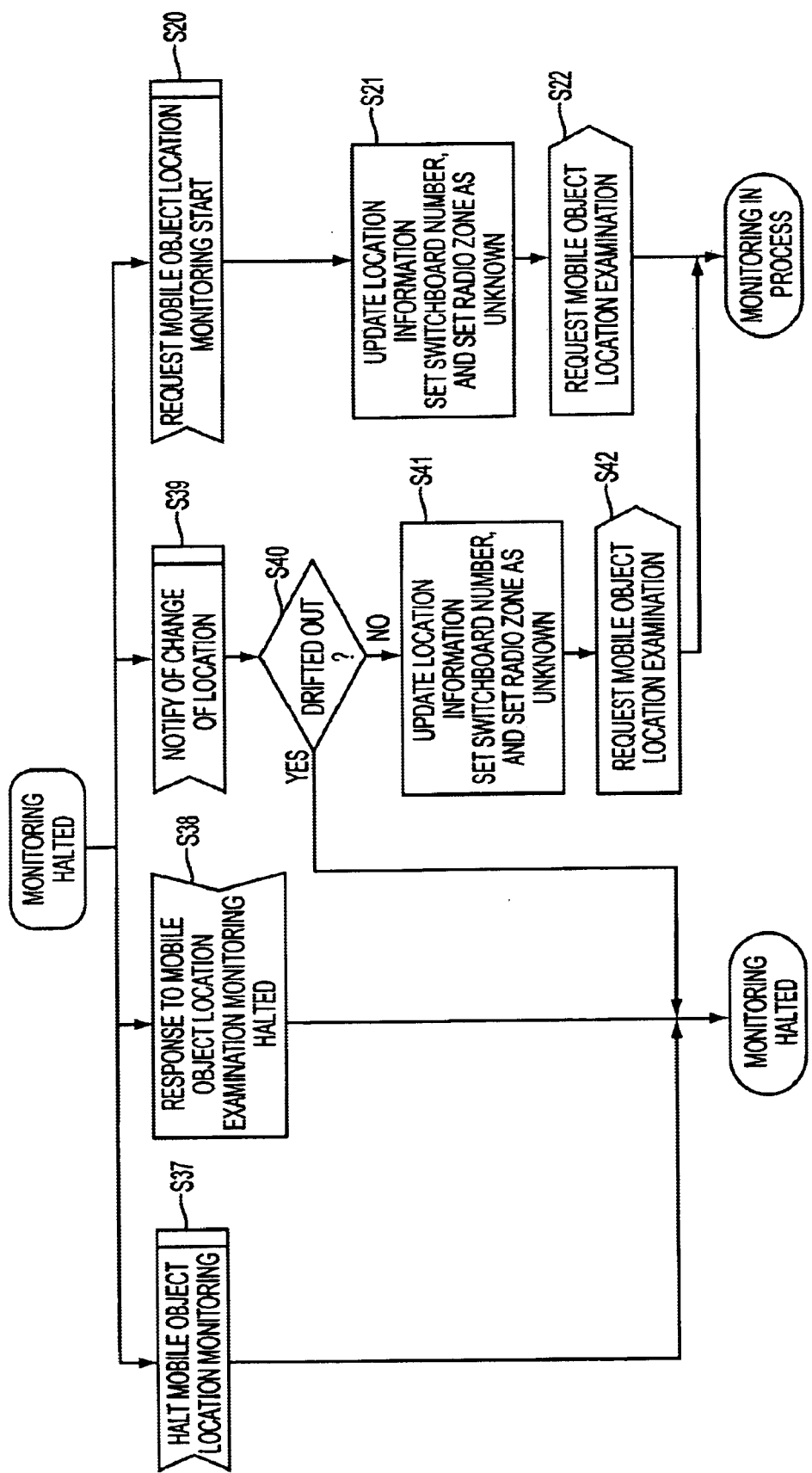
FIG. 7 is a flowchart showing the processing when the monitoring of the location of a mobile object is being halted.
Figure 8:
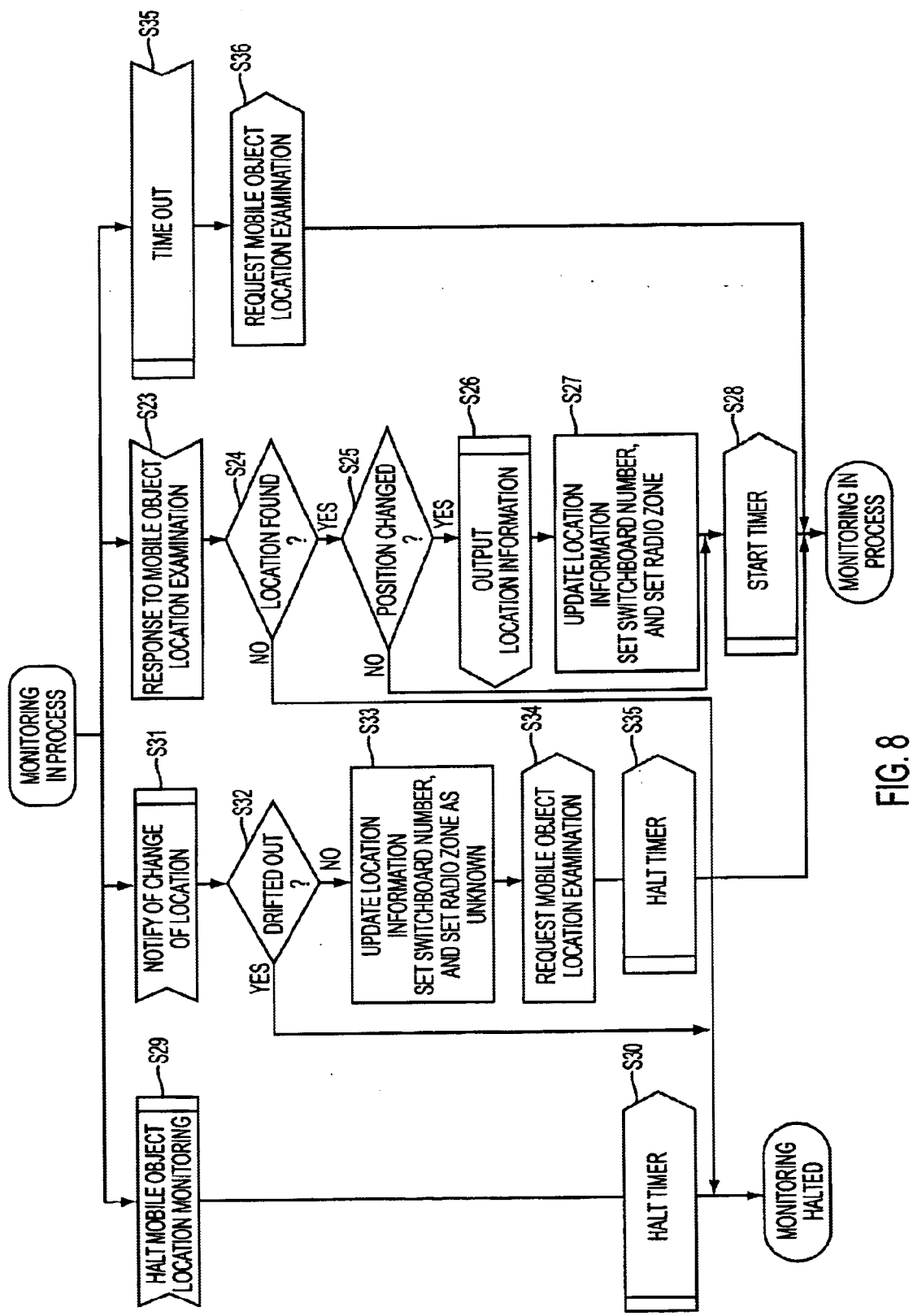
FIG. 8 is a flowchart showing the processing when the monitoring of the location of a mobile object is being halted.

FIG. 7 is a flowchart showing the mobile object location monitoring function when the mobile object location monitoring process is halted, and FIG. 8 is a flowchart showing the mobile object location monitoring function when the mobile object is being monitored. When a mobile object location monitoring request is transmitted (step S5 in FIG. 5 and step S20), the number of a mobile service switching center MSC, for which the location registration has been performed, and a cell zone CZ are updated. Since the cell zone CZ is currently unknown, it is set as unknown (step S21).

Then, a mobile object location examination request is transmitted to the mobile service switching center MSC (step S22). Following this, in FIG. 8, a mobile object location search response is transmitted by the mobile object service switching center MSC, which received the mobile object location search request (step S23).

The mobile service switching center MSC, which responded to the request for the mobile object location examination, employs information indicating whether it has received a paging response from the search target mobile object to determine a cell zone CZ wherein the mobile object is located (step S24). When as a result of this determination the location of the mobile object is not found, the process is shifted to the halted state (step S38).

When the location is found as a result of the determination (step 24) performed to find the cell zone CZ in which the mobile object is located, another check is performed to determine whether the position of the cell zone CZ has changed (step S25).

When the position of the cell zone CZ has changed, location information for the changed cell zone is output to update the location information (step S26). During the updating of the location information, the switching center number and the cell zone are set, and sequentially a timer is started (step S28).

The reason for starting the timer is to prevent the imposition of an excessive load on the network due to frequent mobile object searches.

After the timer is started (step S28), program control returns to the first state in FIG. 8, where the mobile object is being monitored. When the maintenance man enters a request to halt the monitoring of the location of the mobile object (step S29), the timer is halted (step S30). Program control returns to the first state in FIG. 7, where the monitoring of the mobile object is being halted.

In FIG. 8, when during the monitoring process a location change notification is transmitted by another mobile service switching center MSC (step S31), a check is performed to determine whether the mobile object has drifted out to another network (step 32). When the mobile object has drifted out to another network, the monitoring is halted.

When the mobile object is still located in the parent network, the number of a destination switching center is set and a cell zone is set as unknown in order to update the location information (step S33). Then, the mobile object location examination request is transmitted to the destination service switching center MSC (step S34) and the timer is halted (step S35).

When a mobile object location examination response is received from the destination service switching center MSC, program control goes to step S23 in FIG. 8. When a predetermined period of time has expired since the timer was started (step S35), a mobile object location examination request is again issued (step S36).

When a mobile object location examination response is received from the pertinent mobile service switching center MSC, correspondingly, program control goes to step S23 in FIG. 8.

When the operating state is shifted to the halt state in response to the halting of the timer (step S30) in FIG. 8, program control returns to the first state in FIG. 7.

In FIG. 7, both when a mobile object monitoring halt request is entered by the maintenance man (step S37) and when a mobile object location examination response is received (step S24), these requests are ignored, and the mobile object location monitoring is halted.

When in the halted state a location change notification is transmitted by another mobile service switching center MSC (step S39), a check is performed to determine whether the mobile object has drifted out to another network (step S40). When the mobile object has drifted out to another network, the monitoring halted state is continued.

When the mobile object is still located in the parent network, the number of a destination switching center is set and a cell zone is set as unknown to update the location information (step S41). In addition, a mobile object location examination request is transmitted to the destination mobile service switching center MSC (step S42), and the monitoring operation in FIG. 8 waits for a response to the mobile object location examination request (step S23).

Figure 9:
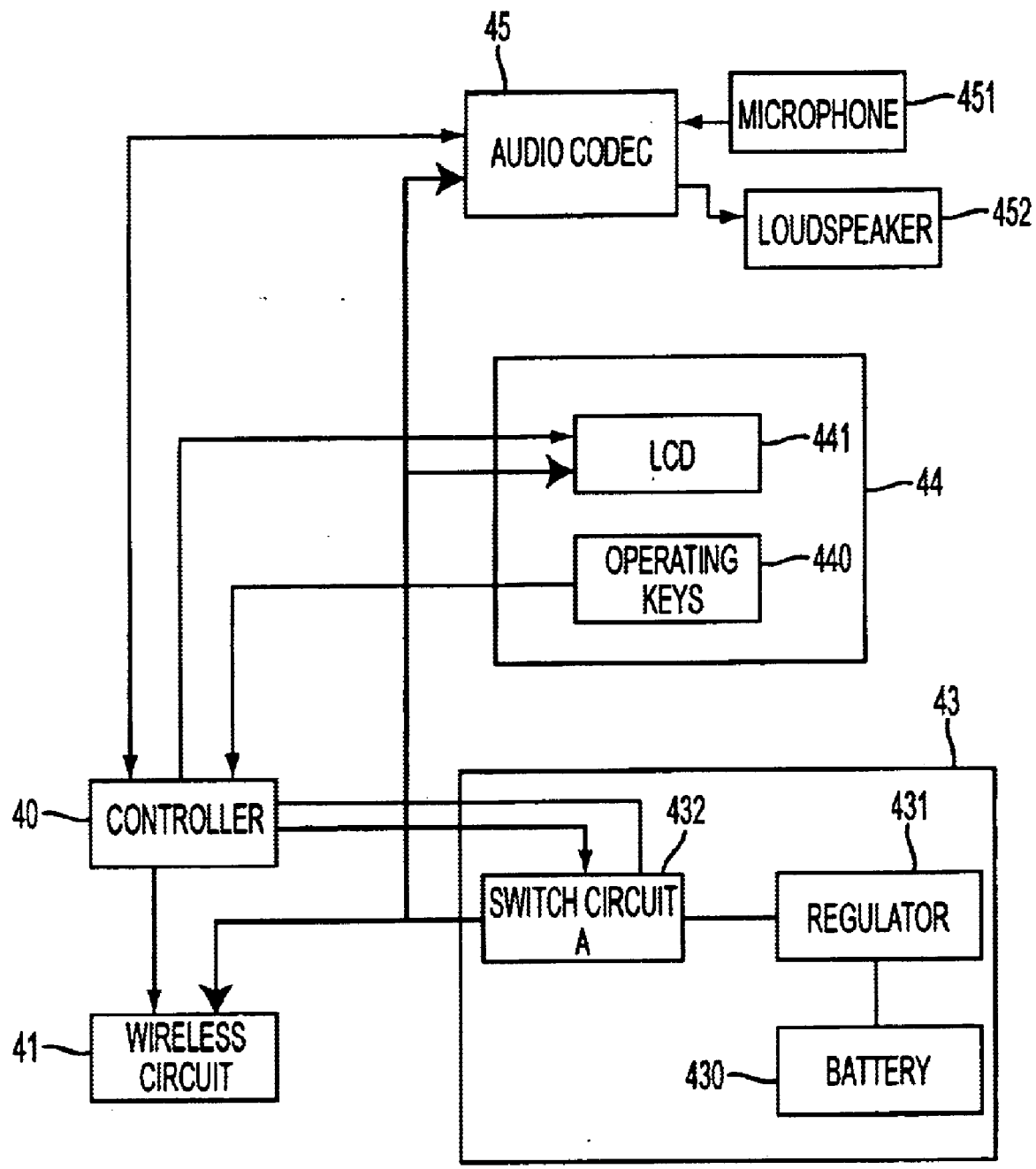
FIG. 9 is a block diagram illustrating the general structure of a mobile object.

For monitoring the location of the mobile object, it is assumed that the radio circuit of the mobile object is active. This will be explained by employing the general structure of a mobile object shown in FIG. 9. In FIG. 9, the mobile object comprises: a controller 40, for controlling the entire mobile object; a wireless circuit 41, for exchanging a radio signal with a base station; a power controller 43, for controlling the supply of power; a display console 44; and an audio codec 45, for performing the analog/digital conversion of audio signals for the respective input and output sounds of via a microphone 451 and a loudspeaker 452.

The power controller 43 employs a regulator 431 to set a predetermined voltage for a battery 430, and by means of a switch circuit 432 supplies the voltage to the individual circuits along paths indicated by solid lines.

The display console 44 is a block which includes a liquid crystal display portion 441 and keys 440. The display on the liquid crystal display portion 441 is controlled by the controller 40, and signals entered using keys 440 are transmitted to the controller 40.

According to the present invention, particularly when a power ON/OFF instruction is entered using the keys 440 and is transmitted to the controller 40, the controller 40 renders on or off the switching circuit 432 of the power controller 43. As a result, the supply of power to the individual circuits is controlled.

In the structure shown in FIG. 9, the supply of power to the wireless circuit 41, as well as to the other functional blocks, is controlled through the switch circuit 432. Therefore, when the switch circuit 432 is turned off by the controller 40, the supply of power to the wireless circuit 41 is accordingly halted.

In such a case, the search for the mobile object is impossible. Therefore, according to one control method of the present invention, a control program can be so set up that in a situation where the location of a mobile object is being monitored, the controller 40 will not turn off the switching circuit 432, even when a power OFF instruction is entered using the keys 440.

Figure 10:
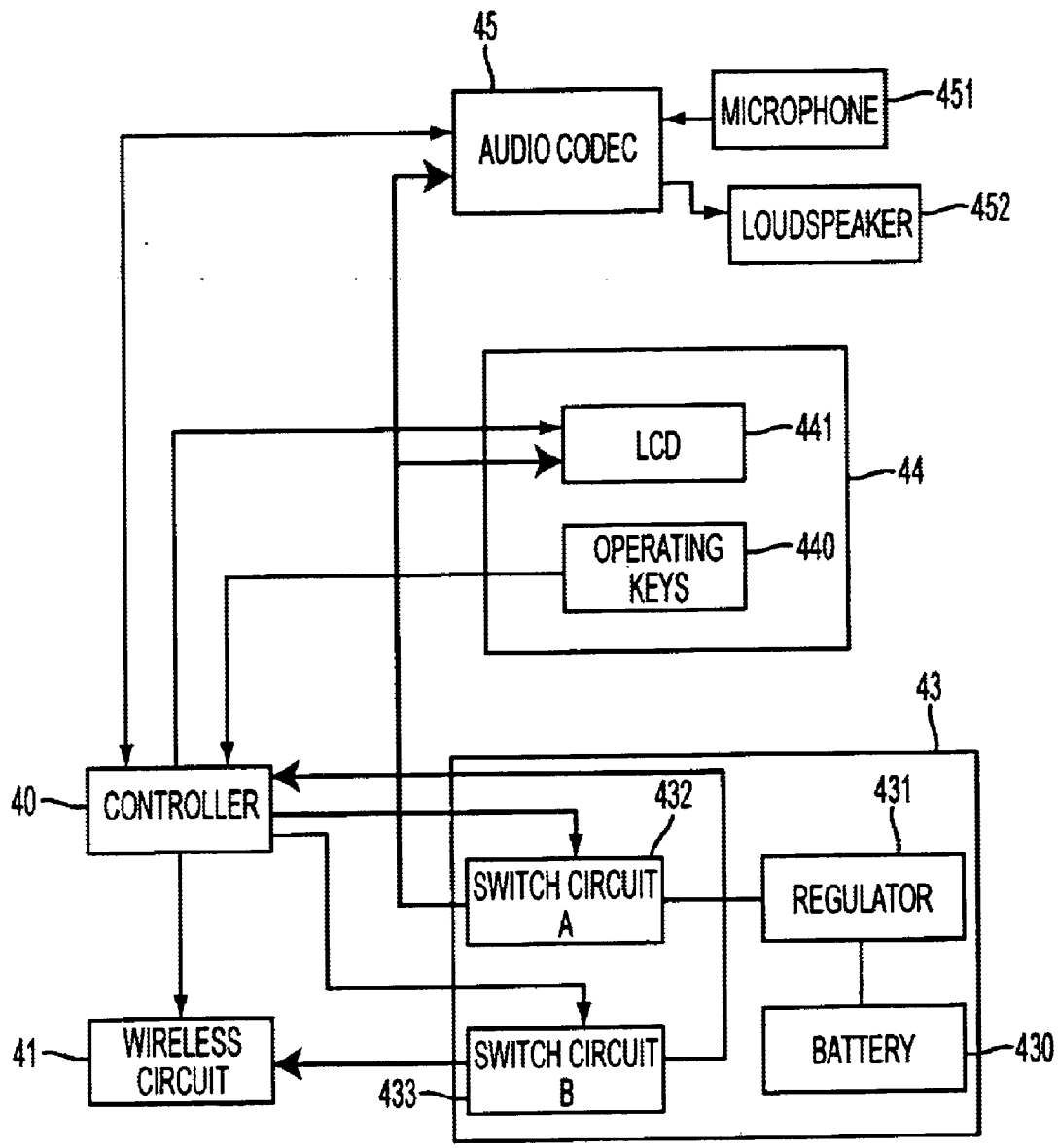
FIG. 10 is a block diagram illustrating the structure of a mobile object according the present invention, which is an improvement of that in FIG. 9.

With this method, however, power is consumed by unnecessary functions. Another example mobile object of the present invention, therefore, is arranged as in FIG. 10. The structure in FIG. 10 differs from the conventional structure in FIG. 9 in that a first switch circuit A 432 and a second switch circuit B 433 are provided for a controller 43.

Under normal operating conditions, the switch circuit A 4232 and the switch circuit B 433 are both off, while when the location of a mobile object is being monitored, only the switch circuit A 432 can be turned off using the keys 440, and power constitutes to be supplied to the controller 40 and the wireless circuit 41.

An explanation will now be given for an example method whereby a notification of the location of a mobile object is transmitted to a base station while the location of the mobile object is being monitored.

Figure 11:
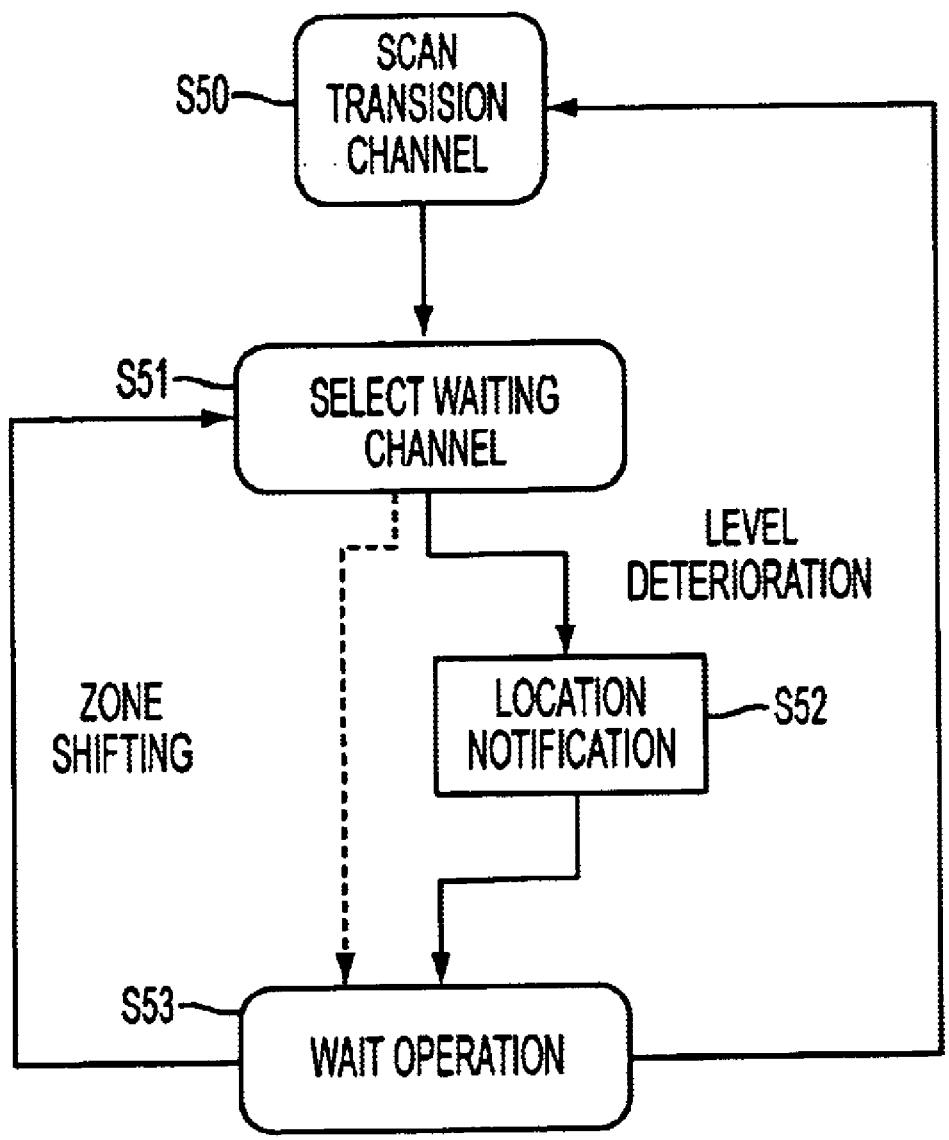
FIG. 11 is a flowchart for explaining an example arrangement of a location notification function.

In an example flowchart in FIG. 11, when a location monitoring command which is added to paging is received, the location of the mobile object is reported to the network each time a waiting channel selection operation is shifted to the wait state.

In FIG. 11, one control channel is designated by a transition channel scanning operation (step S50). The transition channel scanning operation is a process whereby when the mobile object is powered on transition channels (a plurality of predetermined frequencies in a specific band), which are written in an ID-ROM of a mobile object and are used as control channels, are scanned in accordance with the RCRSTD-27 procedures, and frequencies equal to or higher than a predetermined reception level are stored in a memory.

When all the transition channels are scanned and a channel stored in the memory is not found, it is assumed that the mobile object is located outside the area and the scanning of the transition channels is repeated. If a channel stored in the memory is found, a table is prepared for this and the operating state changes to the waiting channel selection state (step S51).

In the waiting channel selection state, a waiting channel selection operation according to the RCRSTD-27 procedures is performed. For this operation, the first frequency in the table which is prepared is employed for synchronization, such as frame synchronization, a CRC check and an alarm information check. A control channel consonant with the waiting permission level is designated as a waiting channel.

Normally, when the waiting channel is selected, program control moves to the waiting operation (step S53), as indicated by a broken line arrow in FIG. 11. During the waiting operation, a location notification is transmitted in response to a location confirmation request.

Figure 12:
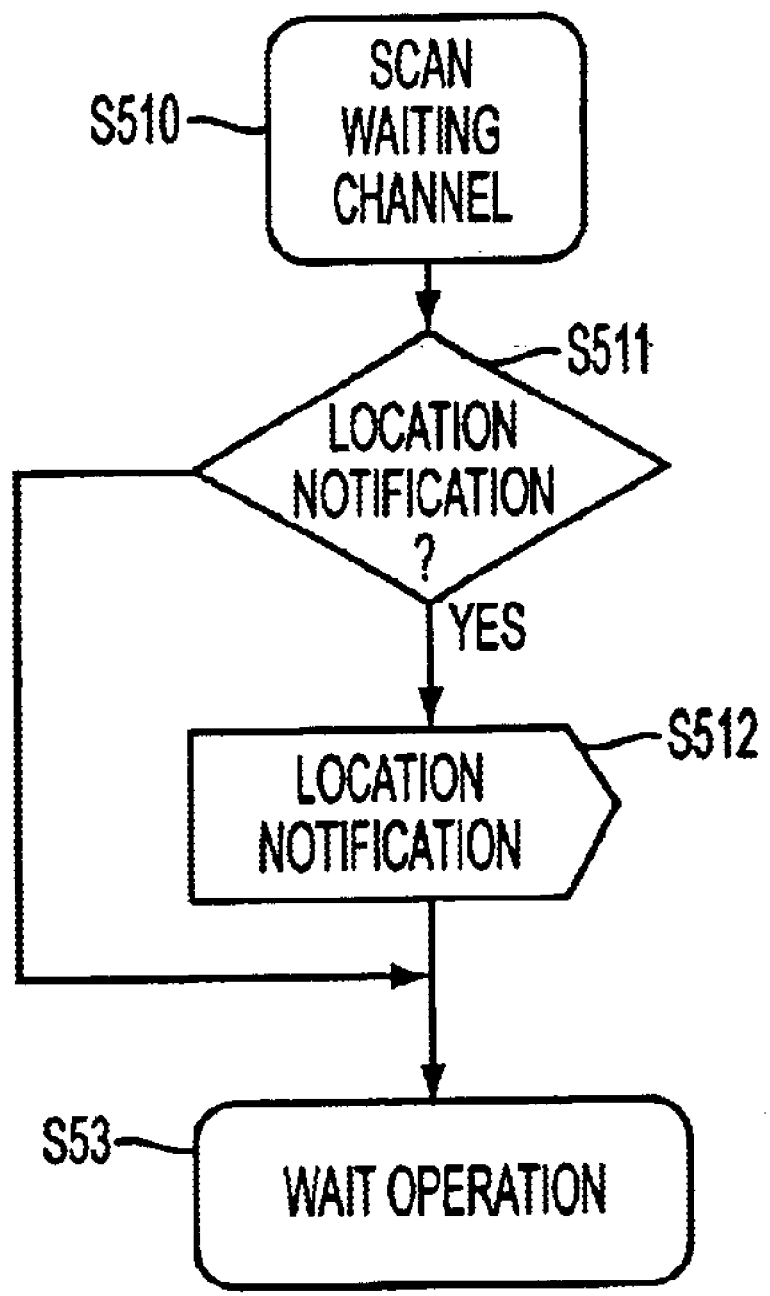
FIG. 12 is a flowchart for the processing performed by the location notification function in FIG. 11.

According to the present invention, a location notification is transmitted (step S52) in accordance with the flowchart in FIG. 12 each time the operating state is shifted to the waiting operation (step S53).

Specifically, in FIG. 12, in the scanning operation (step S510) for selecting the waiting channel (step S51), a check is performed to determine whether an instruction directing the transmission of a location notification has been issued across the mobile service network (step S511). When an instruction directing the transmission of a location notification has been issued, a notification is transmitted (step S512) and program control moves to the waiting operation (step S53), thus setting the operating state to the call waiting state.

When during the waiting operation deterioration of a signal level occurs, the transition channel is scanned again (step S50). And when the zone is changed, the waiting channel is selected (step S51).

Figure 13:
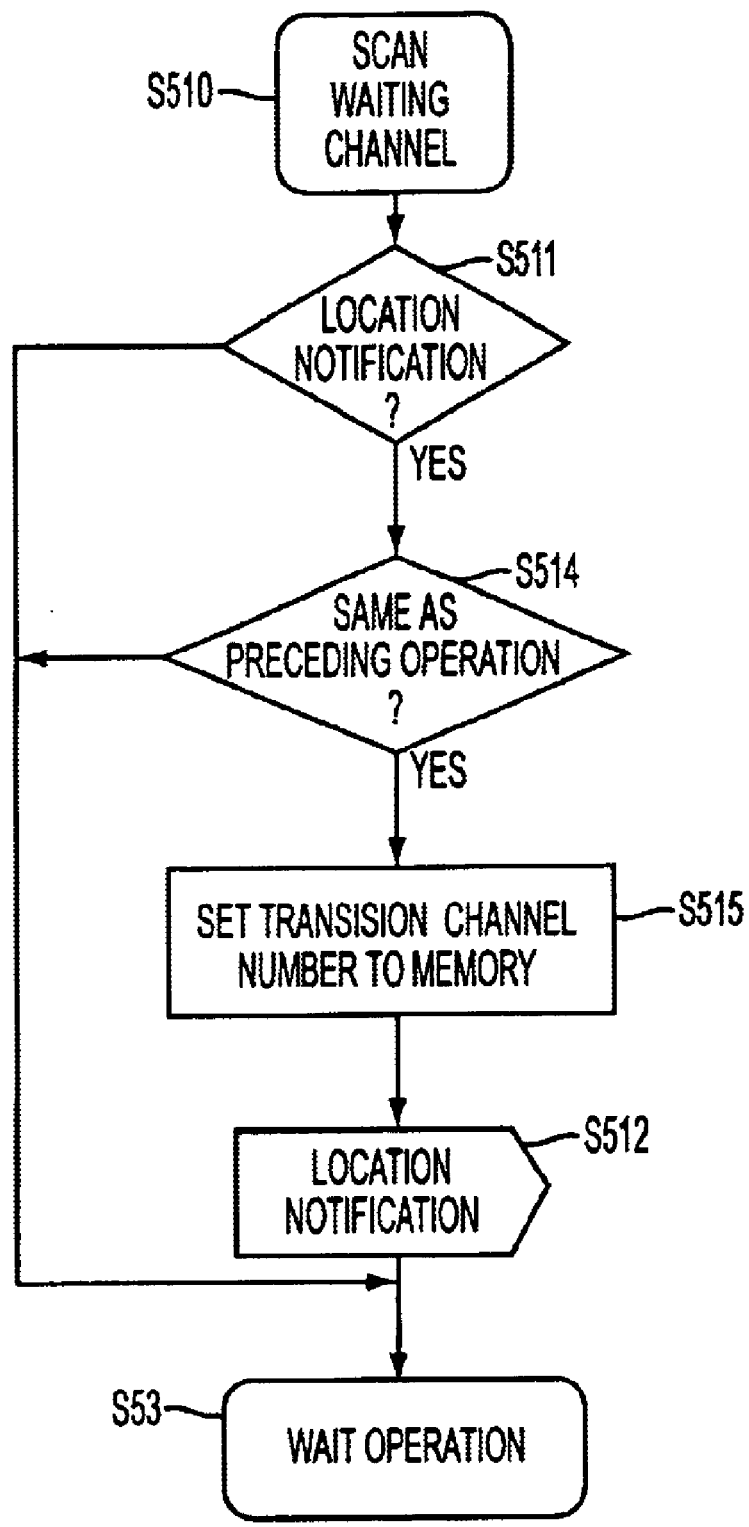
FIG. 13 is a flowchart for another example of the processing performed by the location notification function in FIG. 11.

Generally, since the radio wave reception level of a portable mobile object varies in accordance with how the mobile object (the vibrations of the mobile object) should be handled, a waiting frequency may fluctuate. To prevent this fluctuation, the processing is changed as is shown in FIG. 13. That is, steps S514 and S515 are added to the processing shown in FIG. 12.

In this case, when a location notification instruction is entered (step S511), a current transition channel number is compared with a previously received transition channel number (step S514). When the two numbers match, the transition channel number is set in the memory (step S515) and the location notification is issued (step S512).

Figure 14:
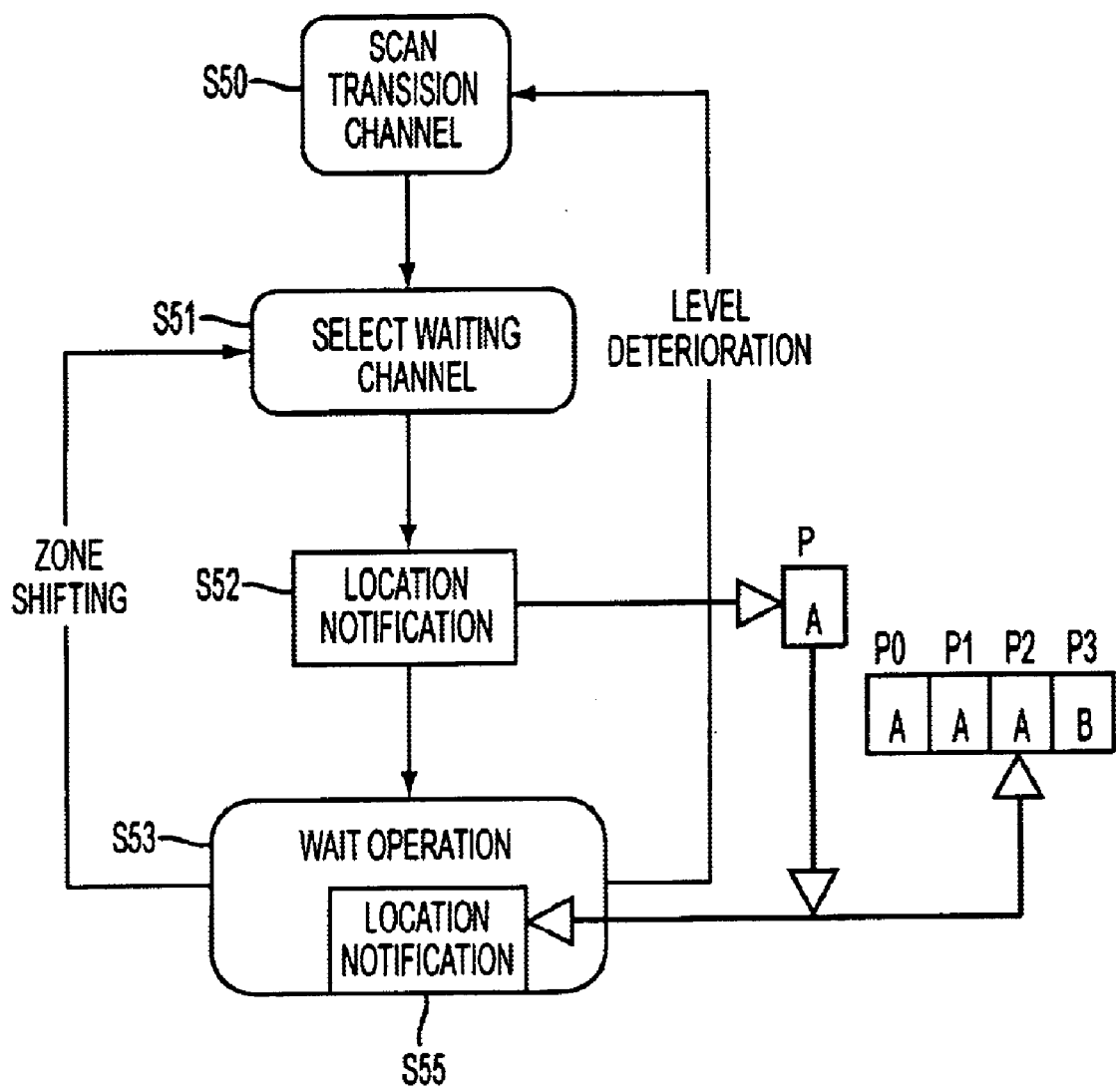
FIG. 14 is a flowchart for explaining another example arrangement for the location notification function.

In FIG. 14 is shown a method, according to an additional embodiment of the present invention, whereby in the transient state change the load imposed on a network is reduced without a location notification being issued. In the flowchart shown in FIG. 14, the location setting is performed instead of the location notification being issued (step S52) as in the flowchart in FIG. 11.

According to this embodiment, if a location notification has been issued before the waiting operation is initiated, the transition channel number is stored. During the waiting operation, when the location is set to the same transition channel for the n-th time since the waiting channel selection operation was initiated, the location notification is issued.

For the location setting operation, whether the location notification has been issued is determined before the operating state is shifted to the waiting operation (step S53), and the transition channel is stored in memory P. In the waiting state, each time the transition channel is selected by the waiting channel selection operation, the channel is also stored in the memory P (indicated by P0, P1, P2, . . . in FIG. 14).

When the same transition channel is stored a plurality of times, e.g., three times, the location notification is issued only the first time (step S55) Therefore, it is possible to prevent the location notification from being issued each time the transition channel is changed.

Figure 15:
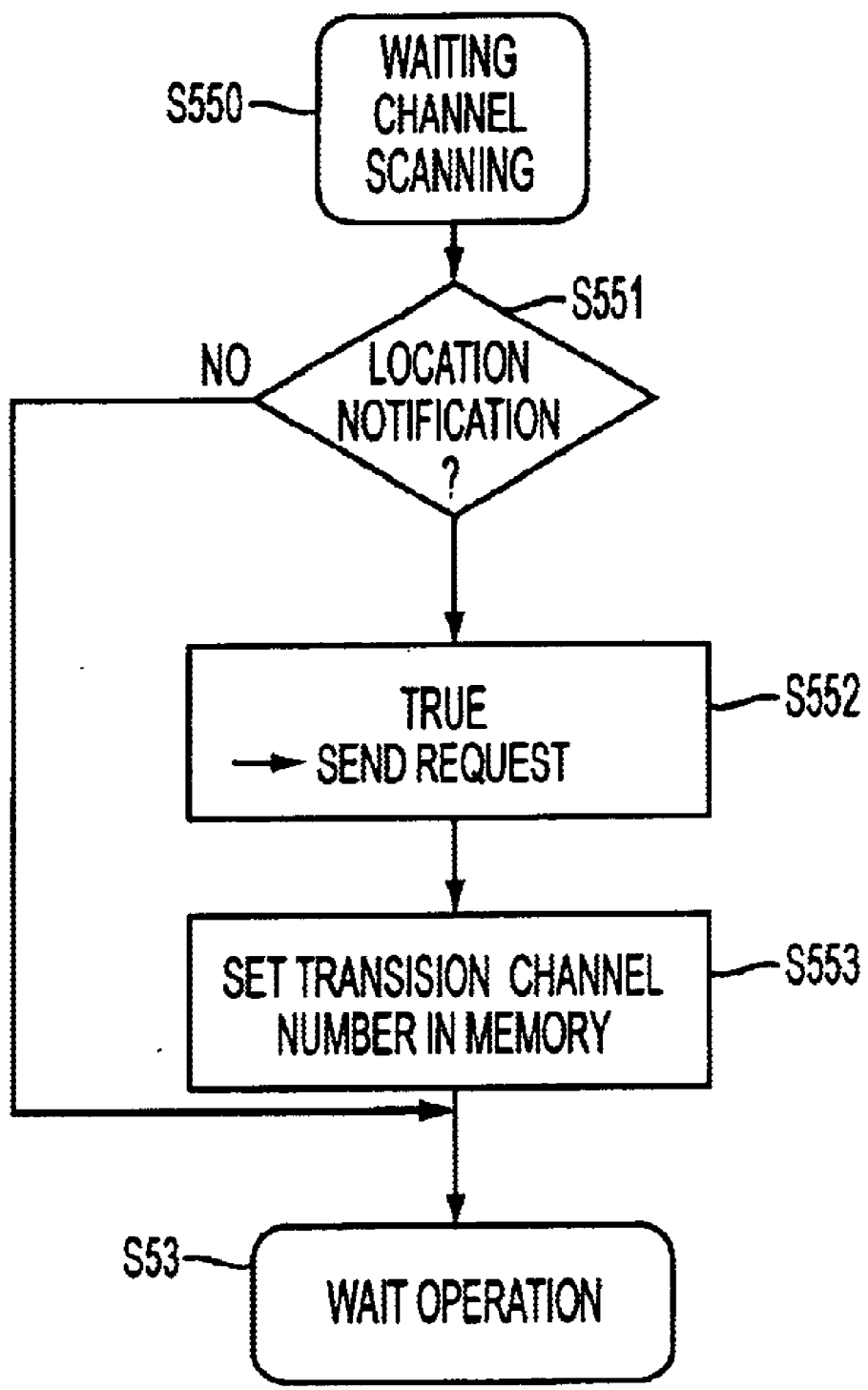
FIG. 15 is a flowchart for the processing performed by the location notification function in FIG. 14.

FIG. 15 is a flowchart showing the location setting in FIG. 14. When during the waiting channel scanning operation (step S550) a location notification instruction is entered (step S551) and a transmission request flag is set to 1 (step S552). Then, a transition channel number is set to the memory P (step S553), and the operating state is shifted to the waiting state (step S53).

Figure 16:
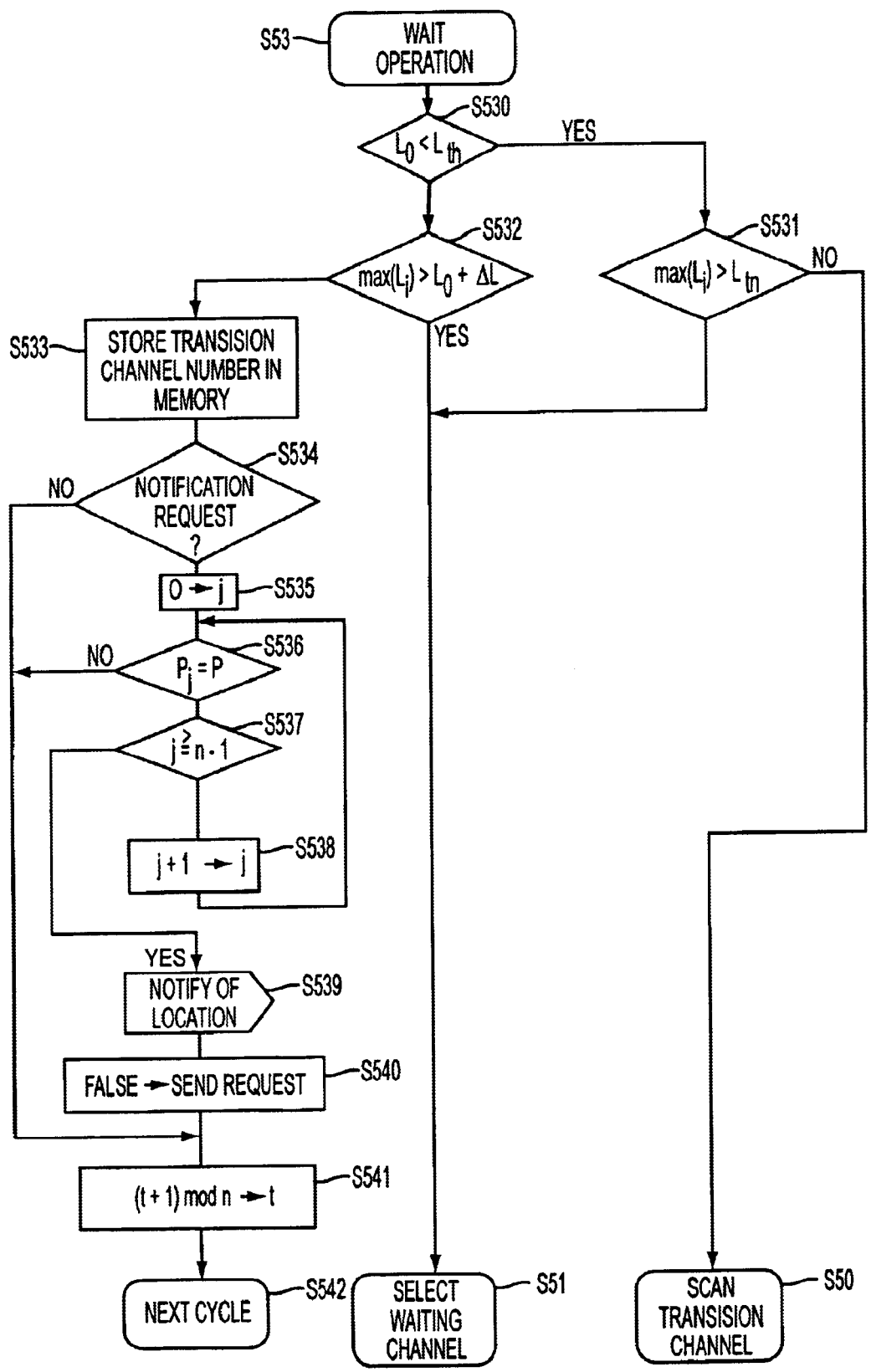
FIG. 16 a flowchart for the location notification processing performed during a wait operation in FIG. 14.

FIG. 16 is a detailed flowchart for the location notification operation (step S55) in the waiting operation (step S53). In the waiting operation (step S53), reception level L0 for the parent station is compared with a waiting deterioration level Lth (step S530).

When the reception level L0 of the parent station is greater than the waiting deterioration level Lth, and the maximum reception level at a peripheral zone is greater than the sum of the reception level L0 and a zone shift level difference $\Delta L$, zone shifting is enabled. Therefore, as is shown in FIG. 14, program control advances to the waiting channel selection operation (step S532 and step S51).

On the other hand, when the reception level L0 of the parent station is smaller than the waiting deterioration level Lth and the maximum reception level at the peripheral zone is smaller than the waiting permission level Ltn, deterioration of the reception level occurs and zone shifting is disabled. Therefore, as is shown in FIG. 14, program control moves to the transition channel scanning operation (step S531 and S50).

When the reception level L0 of the parent station is greater than the waiting deterioration level Lth and when the maximum reception level at the peripheral zone is smaller than the sum of the reception level L0 and the zone shift level difference $\Delta L$, the transition channel number is stored in a memory Pj (j is equal to t) (steps S532 and S533).

Following this, the values stored in the all memories Pj (j=0 to (n−1)) are compared with those in the memory P. When all the values are equal, the location notification is transmitted. That is, when the location notification is issued, the counter is set to 0 (steps S534 and S535), and a check is performed to determine whether all the values in the memories Pj are equal to those in the memory P (steps S536 and S537).

When the counter value j is smaller than (n−1), the counter j is incremented by one (step S538) and program control returns to step S536. When the counter value j is equal to (n−1) (step S537), a location notification is issued (step S539) and the transmission request flag is reset (step S540). Then, the remainder obtained by dividing a count value (t+1) by n is set to the counter t (step S541) and program control returns to the waiting operation for the next cycle (step S542).

According to the embodiments of the present invention which were described above while referring to the drawings, a change in the location information for a calling mobile object can be output by the smallest control area unit in a mobile service network. Further, conducting a search for the source of a malicious call is especially easier, while information required for the investigation of a crime can be provided rapidly and accurately.

The above described embodiments are employed only for the explanation of the present invention; the application of the present invention is not limited to these embodiments.

What is claimed is:

1. In a mobile service network system having a location register and mobile switch center, under which a plurality of base stations are provided, a mobile station search system comprising:

a database storing a location registration area where a mobile station is located;

mobile station tracing means for setting a mobile station tracing indication in the database, when a request for information concerning a location at which the mobile station is located, is transmitted to the mobile switch center; and location monitoring means for repeatedly monitoring a location of the mobile station regardless of a termination of a call connection for the mobile station in a minimum control radio zone of a fixed size provided for each of the plurality of base stations which is smaller than the location registration area and for notifying a change in the minimum control radio zone of the mobile station to respond to the request for location information, the minimum control radio zone being of a minimum area that the mobile service network system can recognize;

wherein said mobile station tracing means and said mobile station location monitoring means are provided in the location register, and wherein said mobile station tracing means includes;

mobile station tracing start means for initiating a mobile station tracing process, and mobile station tracing halting means for halting the tracing of the location of the mobile station.

2. The mobile station search system according to claim 1, wherein said database storing said location registration area is included in said location register, and wherein said mobile station location monitoring means includes a function means for issuing notifications that location registrations have been performed, and continuously notifying location changes, in accordance with said location registrations, between minimum control area units within said location registration area.

3. The mobile station search system according to claim 1, wherein when said mobile station moves to a location registration area of another network, said mobile station tracing indication is transferred to mobile station tracing means of the other network so as to make a location monitoring means of the other network repeatedly monitor the moved mobile station in the other network.

4. A mobile station search method comprising the steps of:

transmitting, to a mobile switching center in a mobile service system having a location register, under which a plurality of base stations are provided, a request for information concerning a location of a mobile station from which a call authorized by said mobile service system has been issued;

setting, in a database, storing a location registration area where a mobile station is located, a mobile station tracing indication when a request for information concerning a location at which the mobile station is located is transmitted to the mobile switch center;

monitoring the location of the mobile station repeatedly regardless of a termination of the call from the mobile station in a minimum control radio zone of a fixed size provided for each of the plurality of base stations, which is smaller than the location registration area, the minimum control radio zone being of a minimum area that the mobile service network system can recognize; and notifying a change in the minimum control radio zone of the mobile station to respond to the request for location information.

5. The mobile station search method according to claim 4, wherein said mobile object is controlled by said mobile service switching center so that power is at least supplied to a radio circuit in said mobile station.

6. A mobile station search method comprising the steps of:

transmitting, to a mobile switching center in a mobile service system, having a location register, under which a plurality of base stations are provided, a request for location information concerning a mobile station from which a call has been issued;

setting, in a database, storing a location registration area where a mobile station is located, a mobile station tracing indication when a request for information concerning a location at which the mobile station is located is transmitted to the mobile switching center;

monitoring the location of the mobile station repeatedly regardless of a termination of the call from the mobile station in a minimum control radio zone of a fixed size provided for each of the plurality of base stations, which is smaller than the location registration area, the minimum control radio zone being of a minimum area that the mobile service network system can recognize;

notifying a change in the minimum control radio zone of the mobile station to respond to the request for location information;

updating said database, based on said request for a search for said location information concerning said mobile station from which a call has been issued, by setting a mobile service switching center number in a location registration area wherein said mobile station is located and by establishing a fact that a radio zone is unknown;

forwarding a request for a mobile station location examination to a mobile service switching center which corresponds to said mobile service switching center number;

specifying, by paging, a radio zone in which said mobile station is located when a response is received to said request for said mobile station location examination;

outputting said specified radio zone as location information; and updating said database by setting said specified radio zone in said database.

7. The mobile station search method according to claim 6, further comprising the steps of:

starting a timer after said location information is updated; and issuing another request for a search for location information concerning said mobile station when said timer count equals a predetermined value.

8. A mobile station search method comprising the steps of:

transmitting, to a mobile service switching center in a mobile service system, having a location register and a mobile switch center under which a plurality of base stations are provided, a request for information concerning a location of a mobile station from which a call has been issued;

setting, in a database storing a location registration area where a mobile station is located, a mobile station tracing indication when a request for information concerning a location at which the mobile station is located is transmitted to the mobile switch center;

monitoring the location of the mobile station repeatedly regardless of a termination of the call from the mobile station in a minimum control radio zone of a fixed size provided for each of the plurality of base stations, which is smaller than the location registration area, the minimum control radio zone being of a minimum area that the mobile service network system can recognize;

notifying a change in the location of the mobile station to respond to the request for location information;

wherein a radio zone, in which said mobile station, as a target of said tracing indication is present, is periodically monitored, and changes in said location of said mobile station are sequentially reported to said mobile service switching center, and wherein a change in the movement of said mobile station in said radio zone is periodically monitored, and when said radio zone is changed, the change in the movement of the mobile station is reported to said mobile service switching center, and wherein a radio zone in which said mobile station is currently present is compared with a radio zone in which said mobile station was previously present, and when a plurality of mismatches are detected, a change in said radio zone is reported to said mobile service switching center.

* * * * *